(12) United States Patent
Hollander et al.

(10) Patent No.: US 7,611,278 B2
(45) Date of Patent: *Nov. 3, 2009

(54) INFRARED THERMOMETERS

(75) Inventors: Milton Bernard Hollander, Stamford, CT (US); Shahin Baghai, Trumbull, CT (US)

(73) Assignee: White Box, Inc., Stamford, CT (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/000,868

(22) Filed: Dec. 1, 2004

(65) Prior Publication Data

US 2005/0117624 A1 Jun. 2, 2005

Related U.S. Application Data

(63) Continuation-in-part of application No. 10/864,696, filed on Jun. 9, 2004.

(60) Provisional application No. 60/526,324, filed on Dec. 2, 2003, provisional application No. 60/529,798, filed on Dec. 16, 2003, provisional application No. 60/537,643, filed on Jan. 19, 2004, provisional application No. 60/539,808, filed on Jan. 27, 2004.

(51) Int. Cl.
*G01K 13/00* (2006.01)
*G01K 1/00* (2006.01)
*G01J 5/00* (2006.01)

(52) U.S. Cl. ........................ 374/142; 374/121; 374/130; 374/208

(58) Field of Classification Search ................. 374/121, 374/124, 130, 141, 120, 208, 142; 359/618; 356/3; 398/9
See application file for complete search history.

(56) References Cited

U.S. PATENT DOCUMENTS

| 3,056,958 | A | * | 10/1962 | Anderson | 342/462 |
| 4,300,823 | A | * | 11/1981 | Yamanaka et al. | 396/106 |
| 4,343,182 | A | * | 8/1982 | Pompei | 374/31 |
| 4,948,258 | A | * | 8/1990 | Caimi | 356/603 |
| 5,823,679 | A | * | 10/1998 | Hollander et al. | 374/121 |
| 6,050,722 | A | * | 4/2000 | Thundat et al. | 374/121 |
| 6,123,453 | A | * | 9/2000 | Hollander et al. | 374/121 |
| 6,272,375 | B1 | * | 8/2001 | Katzir et al. | 600/474 |
| 6,280,082 | B1 | * | 8/2001 | Aoyama et al. | 374/121 |
| 6,290,389 | B2 | * | 9/2001 | Schmidt et al. | 374/121 |
| 6,527,439 | B1 | * | 3/2003 | Bellifemine | 374/121 |
| 6,633,434 | B2 | * | 10/2003 | Hollander | 359/618 |
| 6,667,761 | B1 | * | 12/2003 | Ludwig et al. | 348/61 |
| 7,093,974 | B2 | * | 8/2006 | Kienitz | 374/121 |
| 2002/0048307 | A1 | * | 4/2002 | Schmidt | 374/121 |

(Continued)

*Primary Examiner*—Gail Verbitsky
*Assistant Examiner*—Mirellys Jagan
(74) *Attorney, Agent, or Firm*—William A. Drucker

(57) ABSTRACT

The present invention is directed to a hand-held infrared thermometer or radiometer (1) for measuring, remotely, the temperature of a target surface (3). In one embodiment, the radiometer includes an infrared detector (7), associated optical system (7), and associated circuitry and an LCD display (21). Built into or mounted on the radiometer is a distance measuring device (2), the operation of which is controlled by the radiometer. The device (2) includes an ultrasonic transmitter/receiver (12) and associated circuitry for calculating, from a comparison of the transmitted and received pulses, the distance of the radiometer from the target surface. The distance-to-target is displayed on the LCD display (21).

3 Claims, 8 Drawing Sheets

U.S. PATENT DOCUMENTS

2004/0264542 A1* 12/2004 Kienitz .................... 374/120
2005/0174558 A1* 8/2005 Heinke et al. .............. 356/4.03
2006/0198421 A1* 9/2006 Schreher ................... 374/121
2006/0285574 A1* 12/2006 Chang ..................... 374/141
2008/0265162 A1* 10/2008 Hamrelius et al. .......... 250/330

* cited by examiner

INFRARED THERMOMETERS

This case is a continuation in part of Applicants' copending application Ser. No. 10/864,696 filed Jun. 9, 2004 which claims priority benefit from filings in the United States on Jun. 16, 2003, No. U.S. 60/478,935P and on Jul. 14, 2003 No. 60/486,951P, all of which are incorporated herein by reference. This case claims priority benefit from filings in the U.S. Nos. 60/526,324 of Dec. 2, 2003; 60/529,798 of Dec. 16, 2003; 60/537,643 of Jan. 19, 2004; and of 60/539,808 of Jan. 27, 2004.

FIELD OF THE INVENTION

The present invention relates to hand-held thermometers for measuring temperatures remotely using infrared measurement techniques.

BACKGROUND OF THE INVENTION

Hand-held infrared thermometers (commonly referred to as infrared pyrometers or radiometers) have been used for many years to measure the temperature of surfaces of objects from a remote location. Their principal of operation is well known. All surfaces at a temperature above absolute zero emit heat in the form of radiated energy. This radiated energy is created by molecular motion which produces electromagnetic waves. Thus, some of the energy in the material is radiated in straight lines away from the surface of the material. The radiometer is aimed at the surface from which the measurement is to be taken, and the radiometer optical system receives the emitted radiation and focuses it upon an infrared-sensitive detector. The detector generates an electrical signal which is internally processed by the radiometer circuitry and converted into a temperature reading which is displayed.

Such radiometers are provided with sighting means which enable the users to accurately aim the radiometers. Prior radiometers commonly employ various types of laser beam sighting devices which project one or more visible laser light spots and/or patterns onto the target surface.

Single beam laser sighting devices which generate a single light spot may be used to indicate to the user the center of the target surface, i.e. the zone which is viewed by the radiometer and is determined by the field of view of the radiometer optical system. However, it is necessary to determine not only the location but also the size of this field of view on the target surface to ensure accuracy and reliability of the resultant measurement. For example, if the target surface is smaller than the field of view, or is irregularly shaped, it will not fill the entire field of view and the measurement reading will be low, i.e. in error. If the radiometer optical system is afocal, i.e. focused at infinity, its field of view will change with changes in the distance-to-target. If the optical system is focal, i.e. focused at some distance in front of the radiometer, it will be appreciated that the field of view of the optical system will be such that the size, e.g. diameter, of the field of view changes, and usually increases directly, with the distance of the radiometer from the target surface. The typical energy zone of such radiometers is defined as where 90% of the energy focused on the detector is found. Heretofore, the approximate size of the actual energy zone has been determined by the user by consulting a "distance-to-target" table, or by actual physical measurement.

Single or multiple laser beam sighting devices which are designed to generate multiple light spots or patterns may be used to indicate to the user, both the position and the outline or size of the field of view on the target surface. Sighting devices have also been proposed which generate two converging laser beams which intersect at a predetermined distance corresponding to the location of the focal point of a fixed-focus radiometer optical system, which is the location of the smallest field of view which can be resolved by the radiometer.

However, these prior radiometers or associated sighting devices are not capable of measuring the actual radiometer-to-target distance.

SUMMARY OF THE INVENTION

It is an object of the present invention to provide hand-held remote infrared radiometer which is capable of accurately measuring the radiometer-to-target distance.

In its broadest aspect, the present invention provides a hand-held remote infrared radiometer provided with means to measure the distance of the radiometer from a target surface.

Radiometers embodying the invention preferably possess one or more of the following features:

1. The distance measuring means is built into the radiometer, or alternatively comprises a separate module mounted or mountable on the radiometer, or connectable to the radiometer.

2. The distance measuring means is controlled by the radiometer, whereby the radiometer is operable to start and stop distance measurement as and when required (although a manual override facility may be provided). Automatic control prolongs battery life in the case of portable infrared radiometers by minimizing the power consumption of the distance measuring means since it is only turned on when required. This is an advantage, particularly if the distance measuring means draws more power than the rest of the radiometer circuitry.

3. The visual display device of the radiometer, which is preferably an LCD display device, displays the measured distance, optionally in different engineering units, either simultaneously with or independently of the display of the measured temperature.

4. Once the distance is measured, the size of the field of view/energy zone (i.e. its diameter if circular) at that distance is calculated from the distance measurement by the radiometer processor, and is displayed by the radiometer.

5. Alternatively, the user could use the distance-to-target measurement data to calculate the size of the field of view/energy zone using a "distance-to-target" table.

6. The distance-to-target measurement data is used to adjust the radiometer and/or an associated sighting device.

One option is to use the data to adjust the focus of the radiometer optical system, and therefore the size of the energy zone, at the measured distance, to suit the size or shape of the target surface. In one embodiment, the adjustment locates the focal point of the optical system at the target surface so that the energy zone will be the smallest size/diameter capable of being resolved by the radiometer.

An additional or alternative option is to use the distance-to-target measurement data to adjust the cone or included angle of the field of view of the optical system of the radiometer, thereby to adjust the size of the energy zone to suit the size and/or shape of the target surface, and/or to adjust the sensitivity of the radiometer.

Another additional or alternative option is to use the distance-to-target measurement data to effect relative adjustment between the optical axes of the radiometer optical system and an associated laser sighting device to reduce, minimize, or effectively eliminate, any unwanted or unacceptable parallax errors therebetween at the measured distance.

Yet another additional or alternative option, if the radiometer uses a laser sighting device of the type which generates a pattern or outline of multiple light spots or a continuous light pattern or outline, is to use the distance-to-target measurement data to adjust the spread of the light spots or pattern, e.g. adjust the cone or included angle of the field of view of the sighting device, so as to visibly accurately indicate to the user, the actual outline or size of the energy zone/field of view on the target surface at that particular measured distance.

As discussed earlier, the typical energy zone of a radiometer is defined as where 90% of the energy focussed upon the infrared detector is found. In this respect, another additional or alternative option is to use the distance measurement data to adjust the percentage to 90%, or any other required percentage, at the measurement distance, for example by adjusting the optical system of the radiometer.

When implementing any of the foregoing options, adjustment may be effected automatically under the control of the radiometer processor, or manually by the user based on the data displayed on the radiometer display device.

7. The distance measuring means uses an appropriate one of a number of known techniques, such as are used, for example, in ultrasonic, laser, optical, radar or infrared range finder systems, proximity detection systems or automatic focussing systems.

In one form, the distance measuring means comprises an ultrasonic distance measuring device or system that transmits an ultrasonic waveform, receives the ultrasonic waveform reflected back from the target surface. The distance is calculated based on the time or phase difference between the transmitted and reflected waveforms or pulses. The distance calculation is performed independently of the radiometer circuitry, for example by a processor incorporated in the distance measuring device circuitry, or as another function of the radiometer's processor, or by both processors. However the calculation is performed, the radiometer processor displays the distance information on the radiometer display device.

In another form, the distance measuring means comprises a measuring device or system which uses laser technology to provide visual display such as a scale, or graduations, on the target surface, superimposed on the light pattern produced by the sighting device, indicative of or corresponding to the radiometer-to-target surface distance.

BRIEF DESCRIPTION OF THE DRAWINGS

The invention will be better understood and its advantages will be more apparent from the following detailed description of the best modes of the invention when read in the light of the accompanying drawings, in which.

DETAILED DESCRIPTION OF THE PREFERRED EMBODIMENTS

Figure 1:
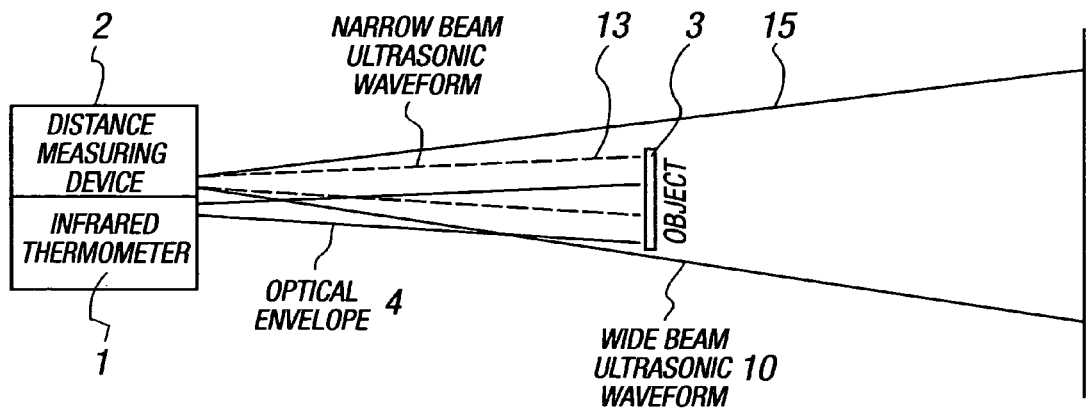
FIG. 1 is a schematic illustration of one embodiment of radiometer.
Figure 2:
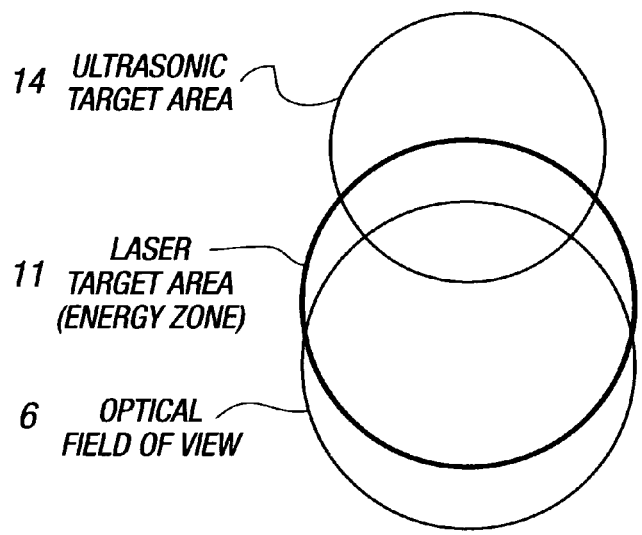
FIG. 2 shows, on an enlarged scale, the outline of the field of view of the radiometer of FIG. 1 and the outlines of the target areas of the associated laser sighting device and ultrasonic distance measuring device, on the target surface of an object.
Figure 3:
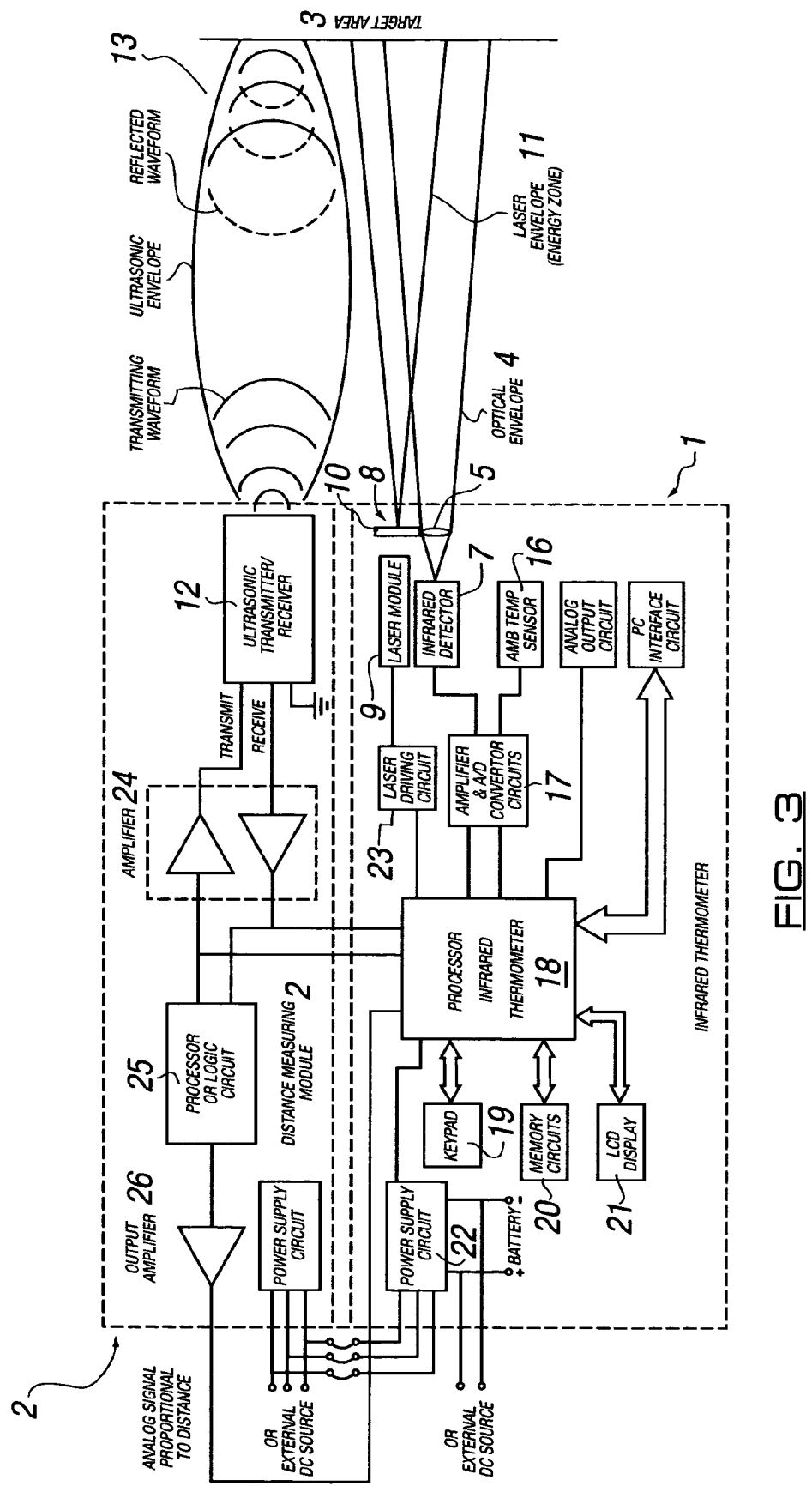
FIG. 3 is a schematic circuit diagram of the radiometer of FIG. 1.

Referring to FIGS. 1 to 3, there is shown schematically a portable, battery operated, hand-held, remote, i.e. non-contact, infrared thermometer, i.e. radiometer 1, provided with a remote, i.e. non-contact, distance measuring device 2. The radiometer is aimed by the user at a target area or surface 3, the temperature of which is to be measured. The optical envelope 4 represents the field of view of the optical system 5 of the radiometer 1 which determines the actual shape and size of the energy zone 6 (FIG. 2) on the target surface 3, the temperature of which is sensed and averaged by the infrared detector 7 of the radiometer. The radiometer is provided with a laser sighting device 8 including a laser module 9 and an associated optical system, such as a diffraction grating 10, which projects a laser beam or beams onto the target surface to define a laser target area or ring 11 of visible light which approximately indicates the outline of the energy zone 6. The ring 11 may be discontinuous and composed of three or more laser light spots, or may be an effectively continuous ring.

In this embodiment, the laser sighting device is built into the radiometer, although it could alternatively comprise a separate module or accessory mounted on its radiometer. Similarly, although the distance measuring device 2 is shown as separate module or accessory mounted on the radiometer, it could alternatively be built into the radiometer.

The distance measuring device 2 in this embodiment incorporates a narrow beam ultrasonic transmitter/receiver or transducer 12, so that the narrow generated ultrasonic beam 13 is capable of pinpointing a relatively small area 14 on the target surface 3 at a relatively long distance. This is important since the distance measuring device should ideally target the same or approximately the same area as the radiometer field of view which includes or defines the energy zone 6, or at least overlap or be adjacent the energy zone on the target surface. If, on the contrary, the distance measuring device transmits a wider beam, for example as shown at 15 in FIG. 1, covering a wider area than the energy zone/target surface, this may result in erroneous distance readings since the energy zone may not be on the same plane as the result of the area covered by the ultrasonic beam.

In the event that the axes of the radiometer, sighting device and distance measuring device are not coaxial and are fixed, they will not necessarily be coincident at the target surface, as illustrated in FIG. 2. Whether or not such a parallax error exists, and the extent of such error, will depend upon the radiometer-to-target distance.

As shown in FIG. 3, the outputs from the infrared detector 7 and an ambient temperature detector 16 are fed via amplifier and analog-to-digital converter circuits 17 to a processor 18 connected to a keypad 19, memory circuits 20 and an LCD display 21, and also to a power supply circuit 22 which powers the radiometer and laser sighting device, either from an internal battery or an external DC source.

The laser module 9 of the sighting device is connected via a laser driving circuit 23 to the processor 18 so that the sighting device will activated and deactivated under the control of the processor.

The ultrasonic transmitter/receiver 12 of the distance measuring device 2 is connected via amplifiers 24 to a processor or logic circuit 25, and to the radiometer processor 18 so that the distance measuring device is activated and deactivated under the control of the processor 18. The output of the processor or logic circuit 25 comprises an analog signal proportional to the measured distance, which is fed via an output amplifier 26 to the radiometer processor 18. The processor 18 processes the distance-to-target measurement data, calculates the field of view size/diameter at the measured distance and, under the control of the keypad 19, displays the distance, field of view and temperature data simultaneously, or separately, on the LCD display 21.

As discussed earlier, in addition to being visually displayed, the distance measurement data can be used to effect adjustment or control of the radiometer, sighting device, and/or distance measuring device.

Figure 4:
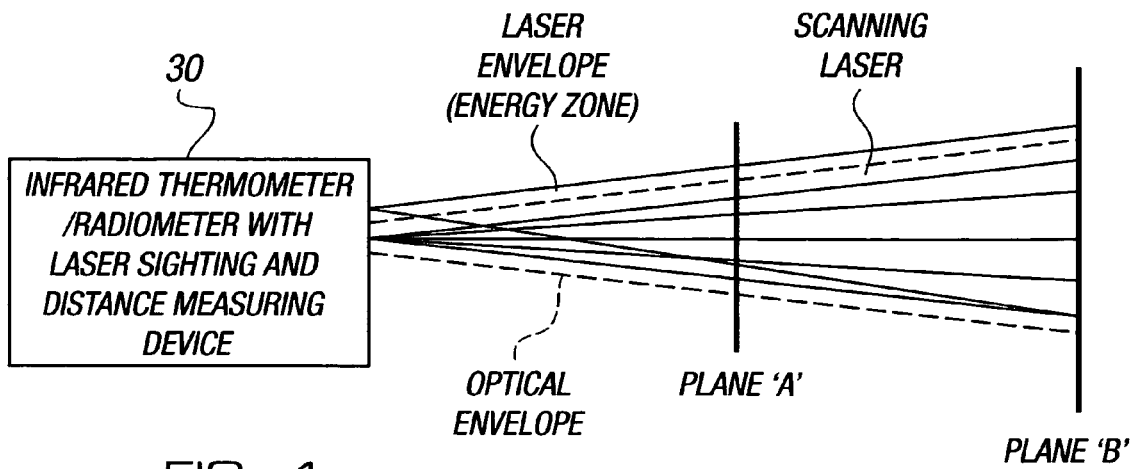
FIG. 4 is a schematic illustration of a second embodiment of radiometer.
Figure 5:
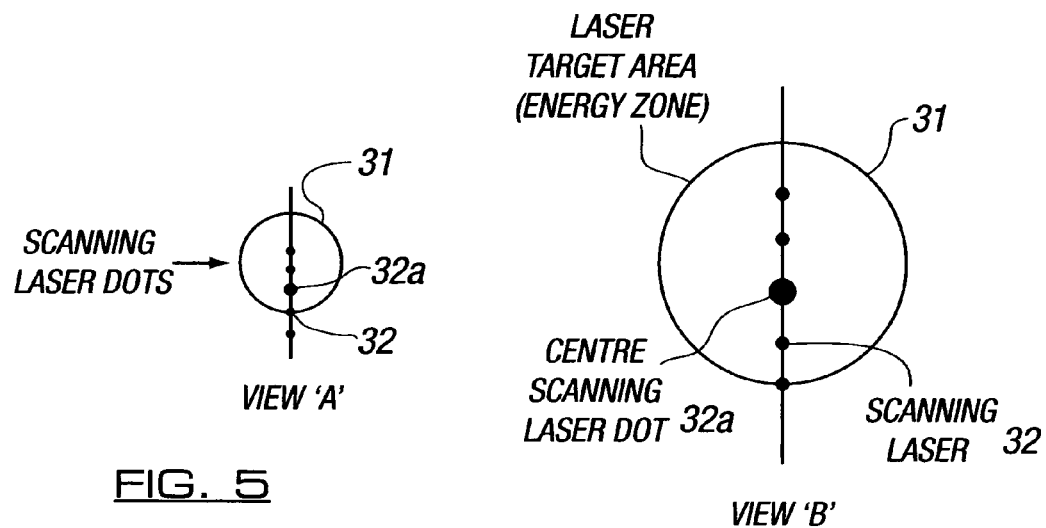
FIG. 5 represents views taken in the plans "A" and "B" in FIG. 4, showing the laser beams of the laser sighting device and of the laser distance measuring device associated with the radiometer of FIG. 4, when the distance measuring device employs laser dot scan technology.
Figure 6:
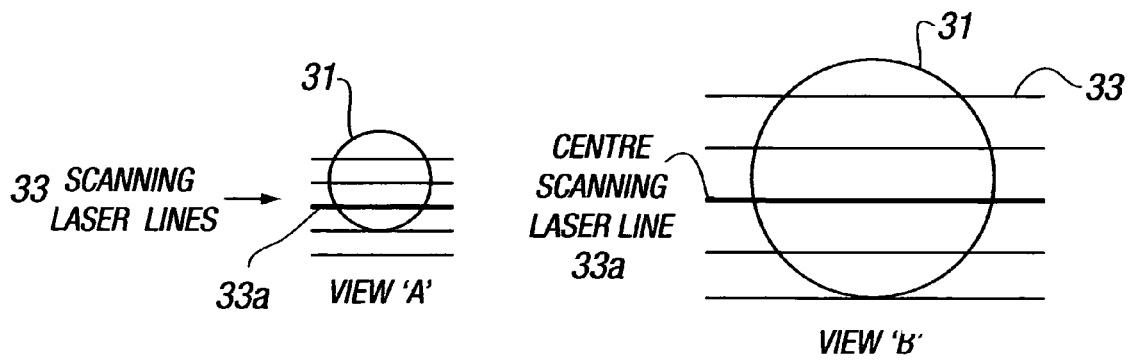
FIG. 6 represents views similar to FIG. 5, when the distance measuring device employs laser line scan technology.

In the embodiments shown in FIGS. 4 to 6, instead of using ultrasonic technology, the distance measuring device uses laser scan technology. In addition, the laser sighting means or device and distance measuring means or device are combined or integrated with the radiometer into a single module or unit 30. As shown in FIGS. 5 and 6, the laser sighting means generates a light ring or circle 31 which outlines or is indicative of the field of view/energy zone 6 of the radiometer, as in the embodiment of FIGS. 1 to 3. Depending upon whether the target surface is located at plane "A" or plane "B" in FIG. 4, the light circle 31 will be sized as shown in View "A" or View "B" in FIG. 5 or 6. The distance measuring means incorporates a second laser or laser pattern which is scanned across the laser light circle 31. The scanned laser pattern can be in the form of a series of visible laser spots or dots 32 as shown in FIG. 5, or a series of parallel visible laser lines 33 as shown in FIG. 6, superimposed on the light circle 31. The center scanned laser dot 32a or line 33a is defined/identifiable clearly from the rest of the series of dots/lines. Since the axes of the sighting means and distance measuring means are mutually offset vertically and inclined, as will be apparent from FIG. 4, the position of the series of dots/lines will move relative to the circle 31 depending upon the distance-to-target, as will be apparent from a comparison of View "A" and View "B" in FIGS. 5 and 6. Each scanned dot 32 or line 33 represents a specific distance. For example one dot/line below the center dot 32a or line 33a (View "A") could represent six feet, two dots/lines below the center dot/line (View "B") could represent twelve feet, etc. By this means, distance can be measured by determining how many scanned dots or lines the energy zone covers.

Figure 7:
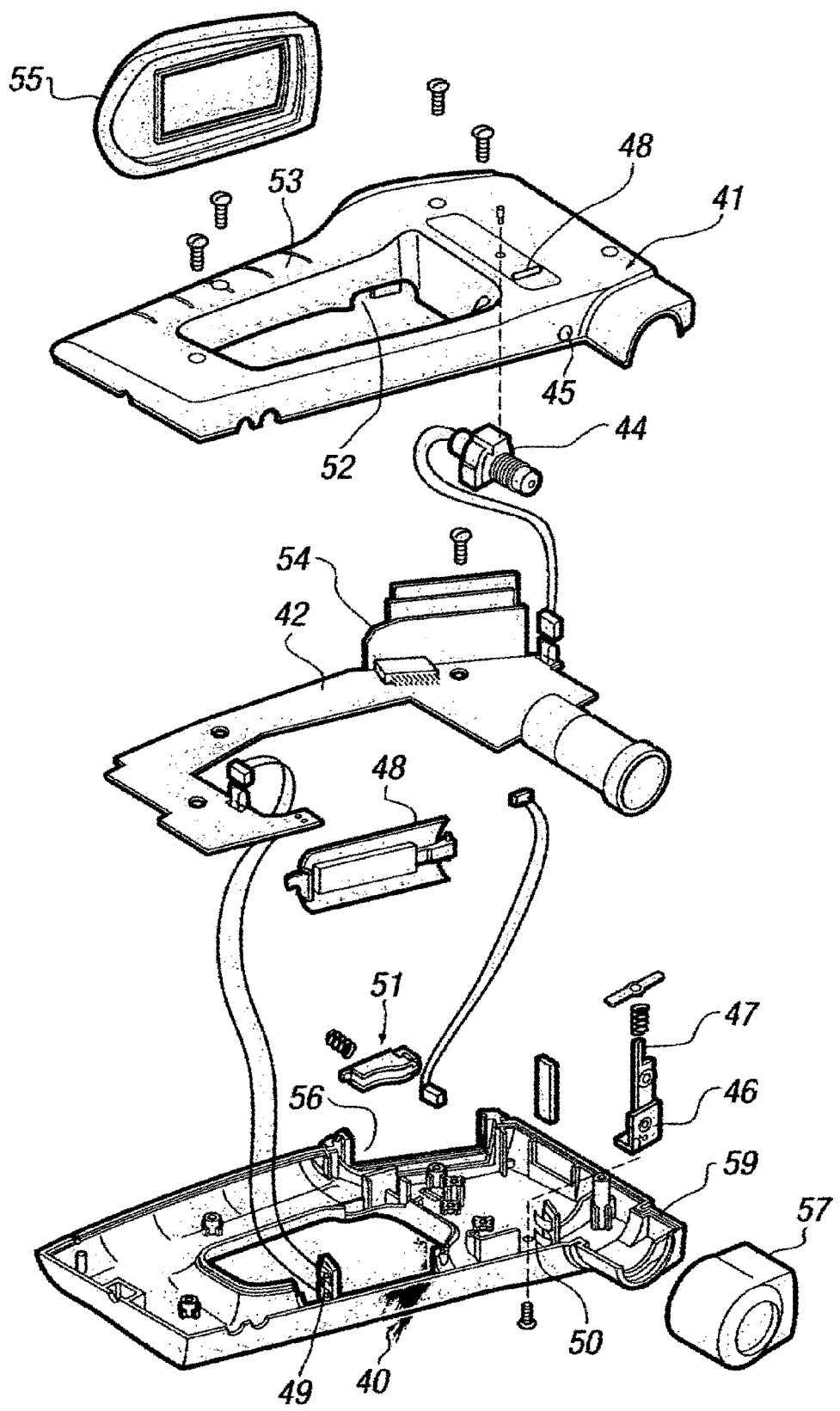
FIG. 7 is an exploded perspective view, in greater detail, of a presently preferred embodiment of the invention showing a radiometer incorporating the circuitry of FIG. 3, with the distance measuring device omitted.
Figure 8:
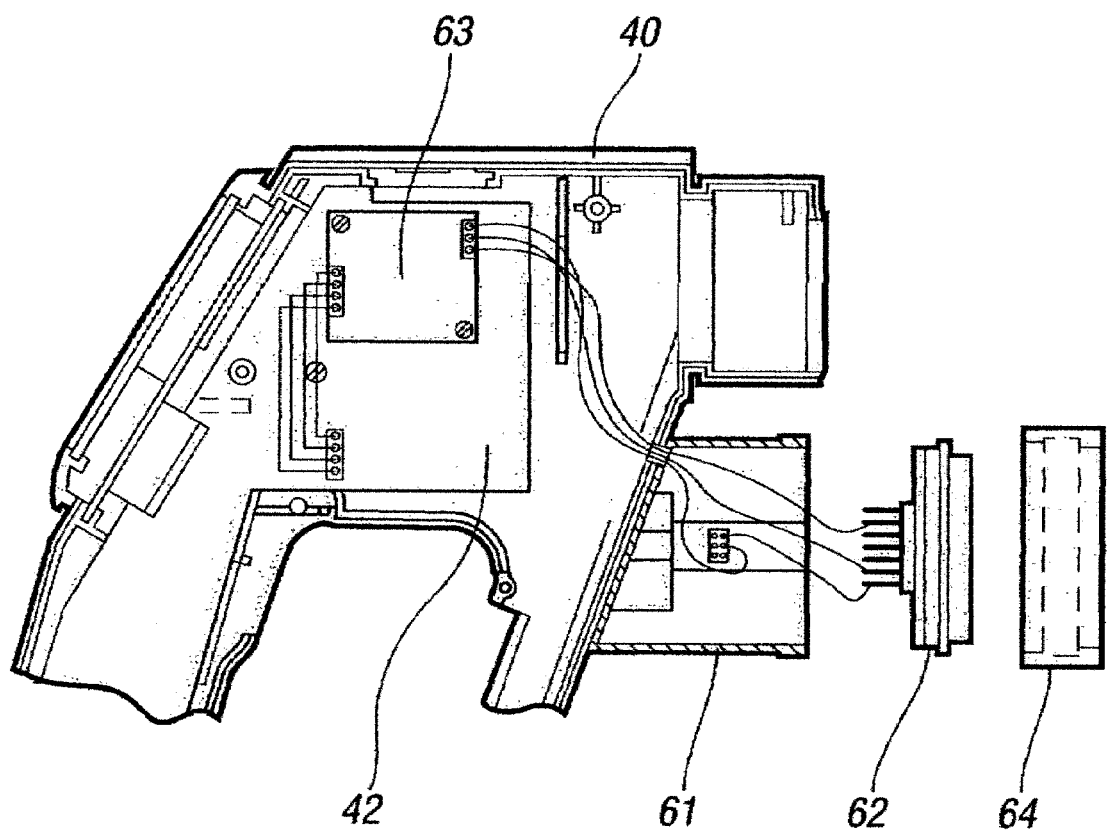
FIG. 8 is an enlarged fragmentary side view of the lower or left hand body shell and main circuit board of the radiometer shown in FIG. 7, showing the distance measuring device.

FIGS. 7 and 8 illustrate a currently preferred embodiment of radiometer which incorporates the circuitry of FIG. 3. The radiometer includes left and right hand body shells 40, 41, i.e a lower shell 40 and an upper shell 41 as viewed in FIG. 7. A main electrical circuit board 42 is sandwiched between the shells when assembled together. The main board carries the processor 18 and associate thermometer circuitry of the radiometer 1 as shown in FIG. 3, or analogous to that shown in FIG. 3. The main board also carries a radiometer optical system 43 incorporating an infrared detector (not shown) connected to the main board circuitry. Alternatively, the detector may be mounted on the main board 42 separately from and in axial alignment with the optical system 43.

A laser sighting device includes a laser module or generator 44 which is carried by the upper shell 41 and is located below the radiometer optical system 43 with its optical axis aligned with an opening 45 in the upper shell. The optical system of the laser sighting device includes a laser beam modifying switch assembly 46, incorporating a diffraction grating, which is carried by the lower shell 40, and is located in the path of the laser beam between the laser module 44 and opening 45. The switch assembly is manually operable, via a lever 47 projecting out through a slot 48 in the upper shell, so that either a single laser beam is projected through the opening to produce a single high intensity light dot or spot at the center of the energy zone on a target surface, or the beam from the module 44 is modified by the diffraction grating to produce a lower intensity ring of laser light or ring of light dots or spots which outlines the energy zone.

A battery compartment, accessible via a door 48, is provided between contacts 49 and 50 carried by the lower shell 40 and wired to the main board circuitry. An on/off trigger switch assembly 51, also wired to the main board circuitry, is located in cut outs 52 in the hand grip portion 53 of the shells for manually pointing, directing and actuating the radiometer and its built-in laser sighting and distance measuring devices. An LCD display board and function switch/keypad panel assembly 54 is also wired to the main board circuitry, and this assembly and associated display bezel 55, are mounted in cut outs 56 in the rear of the hand grip portion 53. A protective resilient lens bezel 57, is fitted over forwardly projecting half bosses 59 of the shells which locate and mount the front end of the radiometer optical system 43.

The radiometer shown in FIG. 7 incorporates a distance measuring device 60 as shown in FIG. 8 which is secured to, or formed integrally with, or detachably attached to, the front of one or both shells 40, 41, below the laser sighting beam opening 45. The device includes a cylindrical housing 61 at the front end of which is mounted an ultrasonic transducer module 62. In one embodiment, this transducer module is a "Mini-A" transducer as supplied by SensComp, Inc. of Livonia, Mich. USA, which typically operates at or above 30 KHz. This transducer module is self-contained in that it incorporates an ultrasonic transmitter/receiver and supporting/drive circuitry necessary to provide an analog voltage output which is linearly proportional to the measured distance, i.e. the module incorporates the circuitry of the device 2 shown in FIG. 3, or analogous circuitry. The DC power input to, and analog output from, the module 62 are wired to an associated printed circuit board 63 carried by and wired to the main circuit board 42. The transducer module 62, which is powered and controlled by the radiometer as described earlier, is held in place at the front end of the cylindrical housing 61 by a resilient, e.g. rubber, boot or bezel 64.

Figure 9:
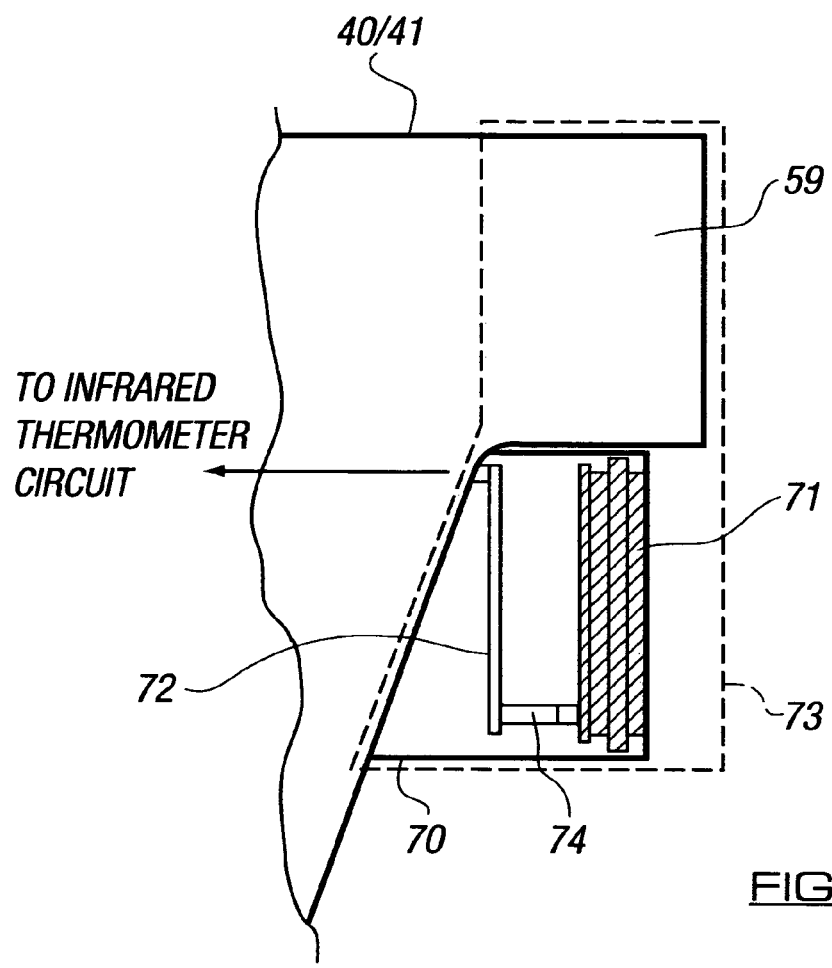
FIG. 9 is a fragmentary schematic side view of the front end of a modified form of radiometer similar to that shown in FIGS. 7 and 8.

In the embodiment shown in FIG. 9, the distance measuring device or module 70 includes a "600 Series" ultrasonic transducer 71, also as supplied by SensComp, Inc., which is connected to, for example plugged at 74 into, an interface circuit board 72 provided with at least some of the necessary transducer support/drive circuitry. The board 72 is, in turn, wired to the radiometer/thermometer circuitry to provide power, and control the operation of the distance measuring module 70. A resilient, for example rubber, boot or bezel 73 holds the distance measuring module detachably assembled to the radiometer, and also encloses the half bosses 59 of the radiometer which house the radiometer optical system. Alternatively, the distance measuring module is permanently attached to or built into the radiometer.

Figure 10:
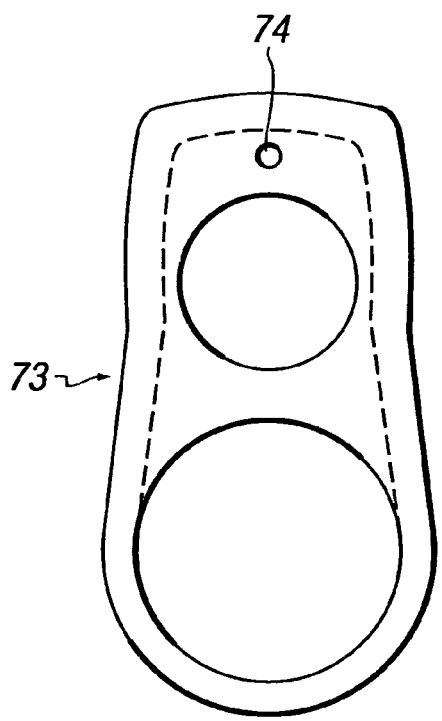
FIG. 10 is a front view of the boot or bezel shown in FIG. 9.

In this embodiment, the laser sighting device (not shown) is arranged to direct its beam or beams through the cavity within the half bosses above the radiometer/thermometer optical system, and through an opening 74 in the boot or bezel 73 as shown in FIG. 10.

In the previously described embodiments, the distance measuring devices may be used or adapted to function as auto focus means whereby, by measuring the distance to the target, the radiometer/thermometer optical system can be adjusted accordingly to achieve the most accurate temperature measurement.

Figure 11:
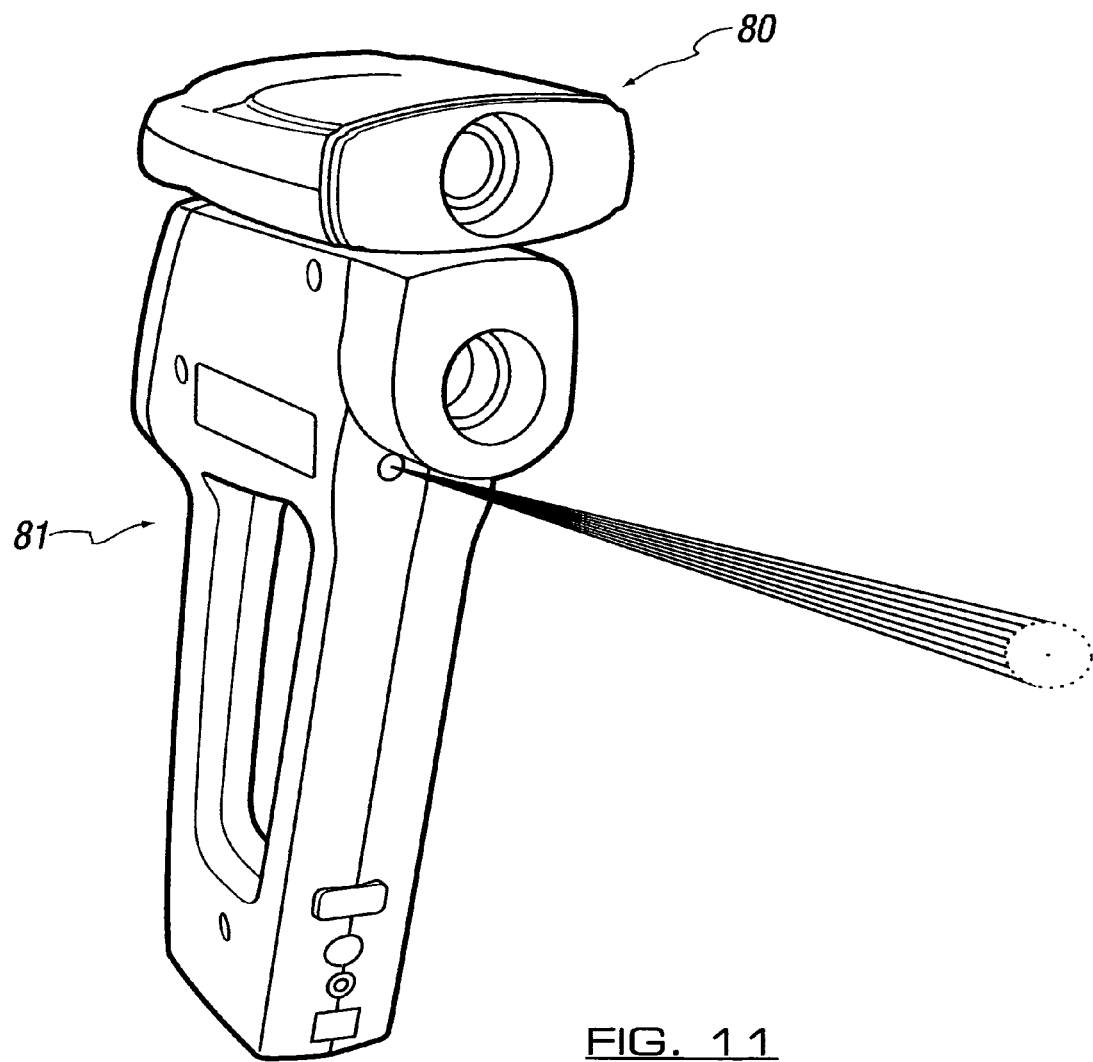
FIG. 11 is a front perspective view of another presently preferred embodiment of the invention showing a radiometer fitted with a separate detachable distance measuring device.

In another currently preferred embodiment as shown in FIG. 11, the distance measuring device comprises a self-contained unit or module 80 detachably mounted on the radiometer 81. For this purpose, a dove tail track or rail (not shown) is provided on top of the radiometer, body or housing, extending parallel to the optical axis of the radiometer/thermometer optical system, for slidably receiving a shoe (not shown) on the underside of the body or housing of the distance measuring unit, so as to accurately align the optical axes of the radiometer and distance measuring unit. In an alternative embodiment, means are provided to adjust the distance measuring device, manually or automatically, to adjust the convergence angle between the latter optical axes.

The distance measuring unit 80 is electrically connected to the radiometer circuitry, by an external cable, and/or cooperating contacts associated with the unit foot and radiometer rail, so as to be powered and controlled by the radiometer. When connected to the radiometer by a cable, the radiometer and unit can be operated with the unit demounted from the radiometer. The unit 80 preferably also incorporates its own function switch/keypad panel, and LCD display where the measured distance can be displayed in different engineering units (e.g. in inches or centimeters).

Instead of being controlled by the radiometer, the distance measuring unit can be completely self-contained, incorporating its own battery or other power source, or being connectable to a separate electrical power source. This unit can therefore be operated and controlled independently of the radiometer on which it is mounted. Alternatively, the unit can be removed from the radiometer and both can be operated and controlled independently of each other.

The distance measuring unit may therefore be provided as a separate accessory to an infrared radiometer, or to any other device measuring instrument, such as an electrical multimeter for example, where a distance measurement is required or would be of benefit.

Figure 12:
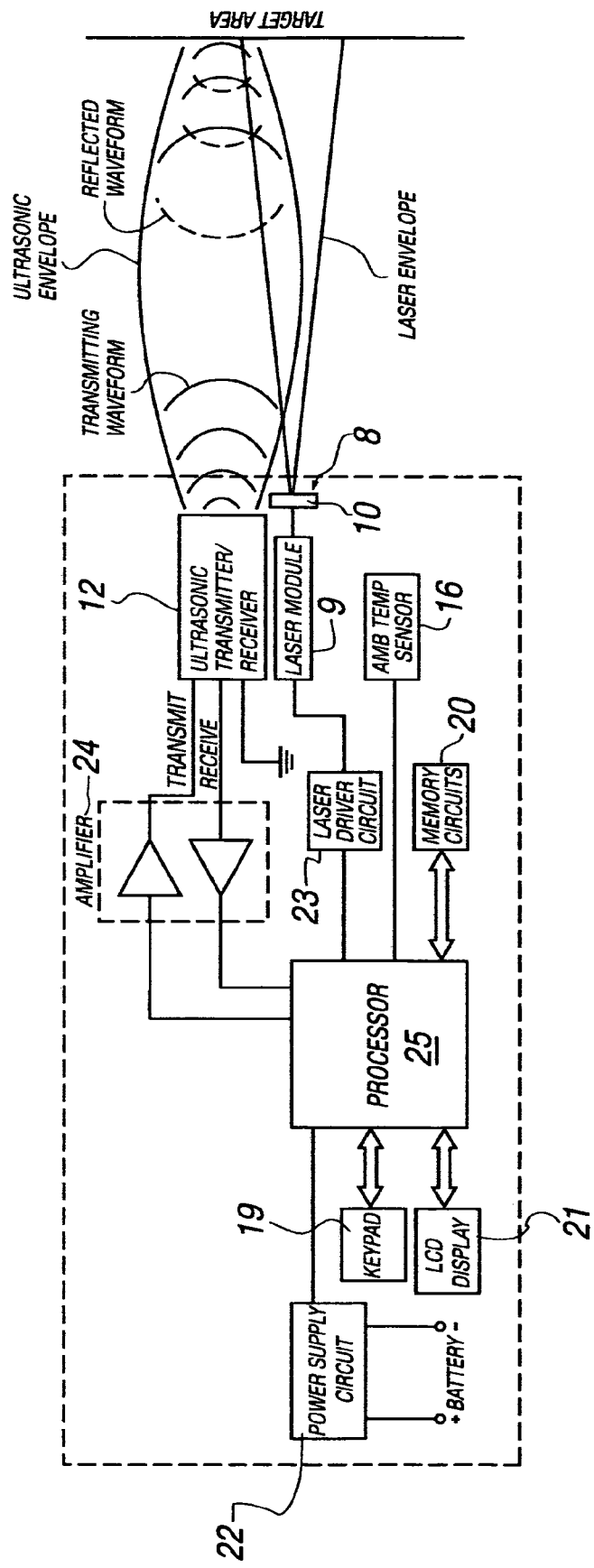
FIG. 12 is schematic circuit diagram of a detachable distance measuring device, similar to that shown in FIG. 11, which incorporates a built-in laser sighting device.

In another currently preferred embodiment, a portable or hand-held distance measuring unit or module, such as that described with reference to FIG. 11, incorporates its own built-in laser sighting device as is shown schematically in FIG. 12. The associated circuitry and components are similar to those described with reference to FIG. 3, and like references are used to identify like components. The laser sighting device 8 generates a visible laser dot or spot and/or ring or circle as previously described, with the ring representing the optical field of view of the radiometer optical system. The built-in LCD display 21 additionally displays the measuring distance, and/or the ring diameter, and/or the ring area.

The laser sighting device is used to aim the distance measuring unit and, when attached to a radiometer which is not provided with its own sighting device, is used to aim the radiometer. When the radiometer is also provided with its own built-in laser sighting device, the distance measuring unit can be adjustably mounted on the radiometer, and adjusted manually, or automatically, so that the beam or beams from the two laser sighting devices coincide at the target surface. This may be achieved by superimposing the central single visible laser spots of both laser sighting devices.

The distance measuring unit preferably uses a relatively narrow beam ultrasonic transducer, enabling it to measure distances to small target areas within the energy zone of the radiometer.

When the distance measuring unit is operated independently of the radiometer, the visible ring generated by the sighting device indicates the area of the ultrasonic transducer beam at distance being measured. Thus, the focal plane of the distance measuring unit will be delineated by a laser ring.

From the foregoing, it will be seen that the present invention encompasses various individual concepts as well as various combinations of concepts. For example, as applied to combinations of radiometers and distance measuring devices, either both, one, or neither, of the radiometer and distance measuring device may be provided with a laser sighting device. The laser sighting device or devices if provided may generate visible laser rings and/or single spots in any combination. For example if both the radiometer and distance measuring device are provided with laser sighting devices, one of the two sighting devices may generate a ring, or both sighting devices may generate a ring; or one or the other sighting device may generate a single central laser spot, or both sighting devices may generate a single laser spot.

It is also envisaged that the distance measuring device, and/or the radiometer to which it is attached will incorporate an adjustment mechanism to align more precisely the focal plane of the distance measuring device with the focal plane of the radiometer. For example, the central spots of the sighting devices of both the distance measuring device and radiometer can be superimposed by means of the adjustment mechanism.

Various modifications may be made without departing from the scope or spirit of the present invention.

For example, in the description of the embodiments of FIGS. 4 to 6, reference has been made to a scanning laser, etc. However, it is not essential for the laser or its optics to physically move, or for the laser beam or beams defining the light spots or dots 32, or lines 33, to move. The series of spots or lines may be static, produced by a static laser and associated optics, such as diffractive optics comprising a diffraction grating.

Also in the embodiments of FIGS. 4 to 6, the axis of the distance measuring means could be angularly adjustable, for example to enable the central light spot 32a or line 33a to be centered in the light ring 31 on the target surface. The angular adjustment data can then be processed to provide a signal proportional to the distance-to-target.

In any of the embodiments, the distance measuring device can be plugged into the infrared thermometer or radiometer, or can be built-in, or can be loosely attached, i.e. attached to the radiometer via a cable. In the latter case, the distance measuring device may be aimed at the target surface independently of the radiometer.

Although, in the various embodiments, the laser sighting device projects a circular pattern of laser light to outline or indicate the energy zone, using at least three laser light spots or a continuous ring of laser light, the sighting device could be adapted to generate non-circular light patterns, for example square, rectangular or triangular patterns to outline corresponding configurations of energy zones.

The invention is not restricted to radiometers, or distance measuring devices for use with radiometers. Any bench top or hand-held electrical multi-meter can have a distance measuring function as one of the functions of the meter. The distance measurement function can be built into the multi-meter, or can be plugged into the multi-meter as a separate probe. Distance measurement can be and is used in construction and process measurement, like remote or non-contact temperature measurement.

In the case of non-contact infrared temperature measurement, the optical field of view of the multi-meter or radiometer can be equal to, greater (wider) than, or smaller (narrower) than the field of view of the distance measuring function. However, if the field of view of the distance measuring function is equal to or smaller (narrower) than the infrared optical field of view, a higher degree of accuracy is achieved because the distance measurement is made within the target temperature area, and not outside of it.

The infrared field of view of a multi-meter or radiometer can be adjustable, where the optical field of view diameter can be adjusted with respect to a distance. The distance itself can be measured separately to assist adjustment of the optical field of view.

The distance reading on a multi-meter or radiometer can be effected simultaneously with the infrared temperature reading, or the readings can be separate and sequential.

The laser sighting device for a multi-meter, a radiometer or distance measuring device can employ a single laser source, or multiple laser sources.

The invention claimed is:

1. A hand-held and hand-directed non-contact temperature measurement system for an energy zone on a remote surface of an object comprising:
    a radiometer having a detector field of view and also comprising a variable focus infrared optical system and an integral processor having optical chart data stored in a memory thereof;
    distance measurement range-finding system means mounted with and coupled to said optical system and to said processor;
    means to form a visible display pattern on said surface, which display pattern indicates the measurement area of the energy zone on said surface;
    wherein said optical system conforms said optical system to focus upon and to conform the radiometer detector field of view to embrace said display pattern by accessing said stored chart data from said memory.

2. A system according to claim 1 which includes one hand grip means for hand direction of said radiometer to the visible surface display to measure the temperature of the indicated energy zone with said radiometer.

3. A system according to claim 1, which includes display means which indicate the measured energy zone temperature and the measured distance between the radiometer and the surface.

* * * * *